(12) United States Patent
Semerad

(10) Patent No.: US 12,318,040 B2
(45) Date of Patent: Jun. 3, 2025

(54) GRINDER VIBRATION TOOL

(71) Applicant: Dylan Semerad, Bismarck, ND (US)

(72) Inventor: Dylan Semerad, Bismarck, ND (US)

( * ) Notice: Subject to any disclaimer, the term of this patent is extended or adjusted under 35 U.S.C. 154(b) by 272 days.

(21) Appl. No.: 18/106,080

(22) Filed: Feb. 6, 2023

(65) Prior Publication Data

US 2023/0337859 A1   Oct. 26, 2023

Related U.S. Application Data

(60) Provisional application No. 63/332,822, filed on Apr. 20, 2022.

(51) Int. Cl.
*A47J 42/46* (2006.01)
*A47J 42/56* (2006.01)

(52) U.S. Cl.
CPC .............. *A47J 42/46* (2013.01); *A47J 42/56* (2013.01)

(58) Field of Classification Search
CPC ............. A47J 42/38; A47J 42/46; A47J 42/56
See application file for complete search history.

(56) References Cited

U.S. PATENT DOCUMENTS

2021/0282447 A1 * 9/2021 Abehasera ................ B08B 9/00

FOREIGN PATENT DOCUMENTS

KR         102239350 B1 * 4/2021

OTHER PUBLICATIONS

English translate (KR102239350B1), retrieved date Dec. 25, 2024.*

* cited by examiner

*Primary Examiner* — Mohammed S. Alawadi
(74) *Attorney, Agent, or Firm* — The Iwashko Law Firm, PLLC; Lev Ivan Gabriel Iwashko

(57) ABSTRACT

A grinder vibration tool, including a main body to be disposed on at least a portion of an herbal grinder, a vibration motor disposed within at least a portion of the main body to vibrate the main body in response to vibration of the vibration motor, and a button disposed on at least a portion of the main body to turn on the vibration motor in response to depressing the button a first time, and turn off the vibration motor in response to depressing the button a second time.

3 Claims, 2 Drawing Sheets

GRINDER VIBRATION TOOL

CROSS-REFERENCE TO RELATED APPLICATIONS

This application claims priority under 35 USC § 120 from U.S. Provisional Application No. 63/332,822, entitled "Grinder Vibration Tool," which was filed on Apr. 20, 2022, in the United States Patent and Trademark Office, the disclosure of which is incorporated herein in its entirety by reference.

BACKGROUND

1. Field

The present general inventive concept relates generally to grinders, and particularly, to a grinder vibration tool.

2. Description of the Related Art

Herbal grinders are useful devices to crush and splice dry herbs and/or spices into smaller components, such as powder and/or trichomes (i.e., outgrowth from plants, algae, lichens). Typically, an herbal grinder operates through a twisting mechanism, such that interlocking teeth will cut the dry herbs and/or the spices until the powder falls into a collection chamber of the herbal grinder. Subsequently, the herbal grinder may be separated to facilitate extraction of the powder.

Unfortunately, after the herbal grinder has completed creating the powder, a mesh between the teeth and the collection chamber prevents some of the powder from falling into the collection chamber. In other words, some of the powder becomes stuck within the herbal grinder's cracks, crevices, and the mesh. As a result, it can be incredibly difficult to maximize extraction of the powder, which makes the overall process tedious, time-consuming, and requires a lot of patience.

Therefore, there is a need for a grinder vibration tool to facilitate extraction of the powder on the mesh and/or any other portion of the herbal grinder.

SUMMARY

The present general inventive concept provides a grinder vibration tool.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a grinder vibration tool, including a main body to be disposed on at least a portion of an herbal grinder, a vibration motor disposed within at least a portion of the main body to vibrate the main body in response to vibration of the vibration motor, and a button disposed on at least a portion of the main body to turn on the vibration motor in response to depressing the button a first time, and turn off the vibration motor in response to depressing the button a second time.

The main body may include a first section, and a second section threadably connected to the first section.

The main body may include a recessed surface to receive the button therein.

The grinder vibration tool may further include a sensor disposed within at least a portion of the main body to detect at least one particulate in contact with the main body and automatically adjust a speed level of the vibration motor based on a location of the at least one particulate in contact with the main body.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Grinder Vibration Tool 100
Main Body 110
Recessed Surface 111
Vibration Motor 120
Button 130
Sensor 140
Power Sources 150
Grinder Vibration Tool 200
Main Body 210
Recessed Surface 211
Vibration Motor 220
Button 230
Sensor 240
Power Sources 250

Figure 1A:
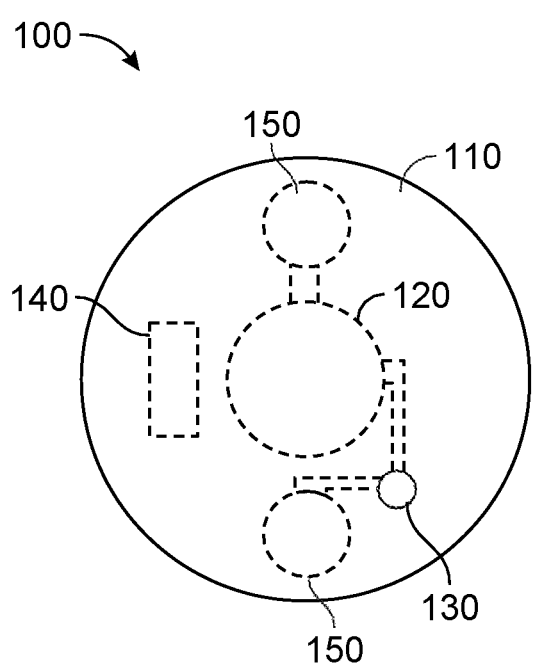
FIG. 1A illustrates an elevational top sectional view of a grinder vibration tool, according to an exemplary embodiment of the present general inventive concept.
Figure 1A:
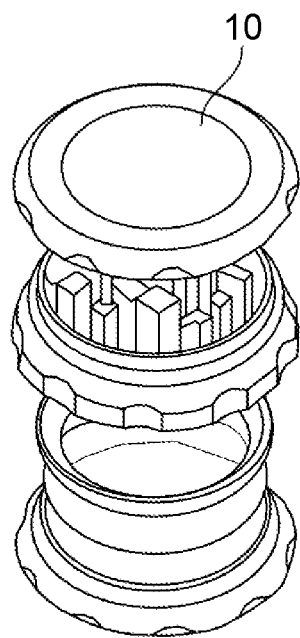

FIG. 1A illustrates an elevational top sectional view of a grinder vibration tool 100, according to an exemplary embodiment of the present general inventive concept.

Figure 1B:
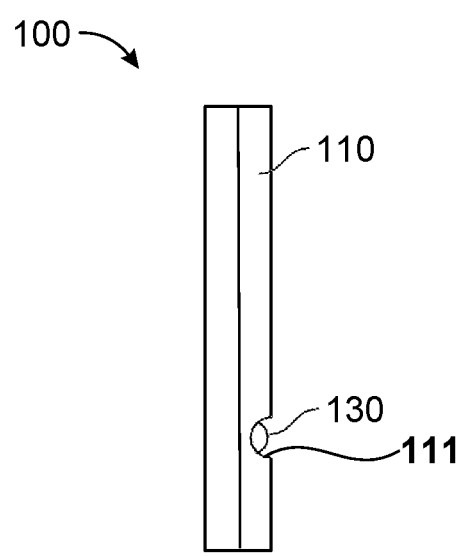
FIG. 1B illustrates an elevational side view of the grinder vibration tool, according to an exemplary embodiment of the present general inventive concept.

FIG. 1B illustrates an elevational side view of the grinder vibration tool 100, according to an exemplary embodiment of the present general inventive concept.

The grinder vibration tool 100 may be constructed from at least one of metal, plastic, wood, glass, and rubber, etc., but is not limited thereto.

The grinder vibration tool 100 may include a main body 110, a vibration motor 120, a button 130, a sensor 140, and a plurality of power sources 150, but is not limited thereto.

Referring to FIGS. 1A and 1B, the main body 110 is illustrated to have a cylindrical shape. However, the main body 110 may be rectangular, circular, conical, triangular, pentagonal, hexagonal, heptagonal, octagonal, or any other shape known to one of ordinary skill in the art, but is not limited thereto.

The main body 110 may be constructed of aluminum and/or silicone. The main body 110 may have a predetermined diameter and a predetermined height. For example, the main body 110 may have a diameter of thirty point sixty-one millimeters (30.61 mm) and a height of four millimeters (4 mm). As such, the main body 110 may be removably disposed within at least a portion of an herbal grinder 10. Specifically, the main body 110 may be removably disposed on at least a portion of a mesh screen of the herbal grinder 10.

The main body 110 may include a recessed surface 111, but is not limited thereto.

The recessed surface 111 may be disposed on at least a portion of the main body 110. Moreover, the recessed surface 111 may be recessed with respect to an outer surface of the main body 110.

Additionally, the main body 110 may be separated into two halves, a first section and a second section. In other words, the first section of the main body 110 may be threadably (i.e., threads) connected to the second section of the main body 110.

The vibration motor 120 may be disposed within at least a portion of the main body 110. The vibration motor 120 may vibrate in response to turning on. As such, the main body 110 may vibrate in response to vibration of the vibration motor 120.

As a result, the mesh screen of the herbal grinder 10 may vibrate in response to vibration of the main body 110, such that a powder, at least one crystal, and/or at least one trichome disposed on the mesh screen may loosen and/or fall into a collection chamber of the herbal grinder 10.

The button 130 may be disposed on at least a portion of the recessed surface 111 of the main body 110. Referring again to FIG. 1B, the button 130 may be disposed at a lower elevation with respect to the outer surface of the main body 110. The vibration motor 120 may turn on in response to depressing the button 130 a first time. Conversely, the vibration motor 120 may turn off in response to depressing the button 130 a second time different from the first time.

Alternatively, the vibration motor 120 may vibrate at a first predetermined speed level in response to depressing the button 130 for a first predetermined period of time (e.g., five seconds). The vibration motor 120 may vibrate at a second predetermined speed level in response to depressing the button 130 for a second predetermined period of time (e.g., ten seconds), such that the second predetermined speed level is greater than the first predetermined speed level. As such, the vibration motor 120 may loosen the powder, the at least one crystal, and/or the at least one trichome that are more difficult to remove while using the second predetermined speed level that was not successful during the first predetermined speed level.

The sensor 140 may be disposed within at least a portion of the main body 110. The sensor 140 may detect at least one particulate from the powder, the at least one crystal, and/or the at least one trichome in contact with the main body 110. As a result, the sensor 140 may automatically regulate and/or control a speed level of the vibration motor 120 based on the at least one particulate in contact with the main body 110. Furthermore, the sensor 140 may adjust a portion of the main body 110 to vibrate using the vibration motor 120 based on which part of the main body 110 is in contact with the at least one particulate. For example, a first quarter and/or a first half of the main body 110 may have more particulates in contact thereto than a second quarter and/or a second half of the main body 110. As such, the first quarter and/or the first half of the main body 110 may vibrate faster than the second quarter and/or the second half of the main body 110 in response to adjustment of the speed level of the vibration motor 120 by the sensor 140.

Each of the plurality of power sources 150 may include a battery and a solar cell, but is not limited thereto.

The plurality of power sources 150 may be disposed within at least a portion of the main body 110. The plurality of power sources 150 may provide power to the vibration motor 120, the button 130, and/or the sensor 140.

Furthermore, an interior of the main body 110 including the vibration motor 120, the sensor 140, and/or the plurality of power sources 150 may be accessed in response to separating the first section of the main body 110 from the second section of the main body 110.

Therefore, the grinder vibration tool 100 may facilitate extraction of the powder, the at least one crystal, and/or the at least one trichome from the mesh screen of the herbal grinder 10. Also, the grinder vibration tool 100 may reduce time needed to remove the powder, the at least one crystal, and/or the at least one trichome due to automatic shaking thereof instead of by a user.

Figure 2A:
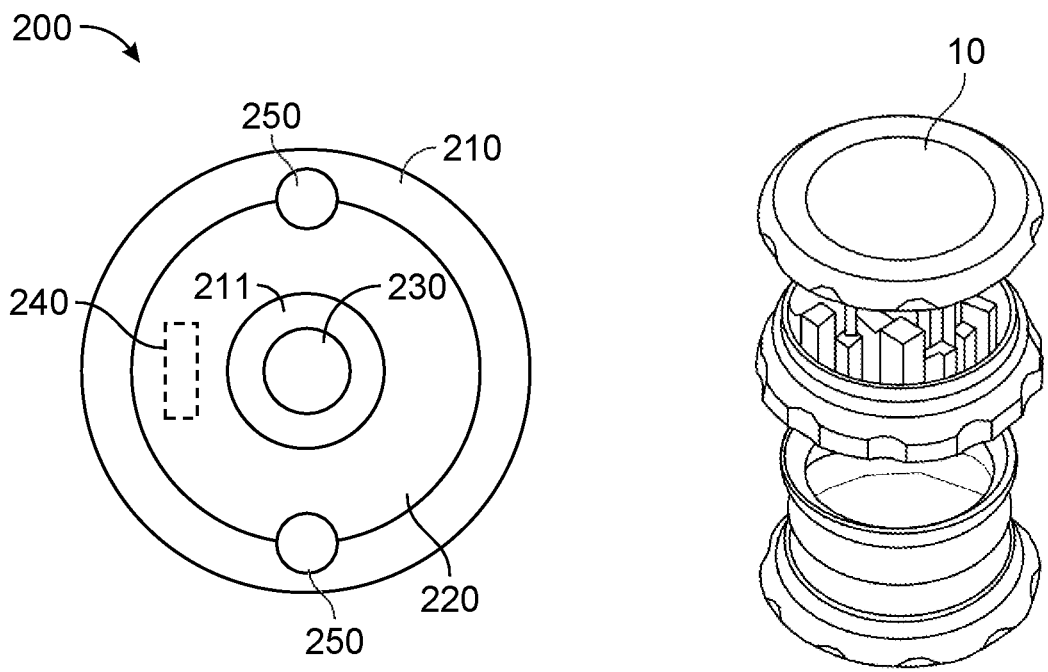
FIG. 2A illustrates an elevational top view of a grinder vibration tool, according to another exemplary embodiment of the present general inventive concept.

FIG. 2A illustrates an elevational top view of a grinder vibration tool 200, according to another exemplary embodiment of the present general inventive concept.

Figure 2B:
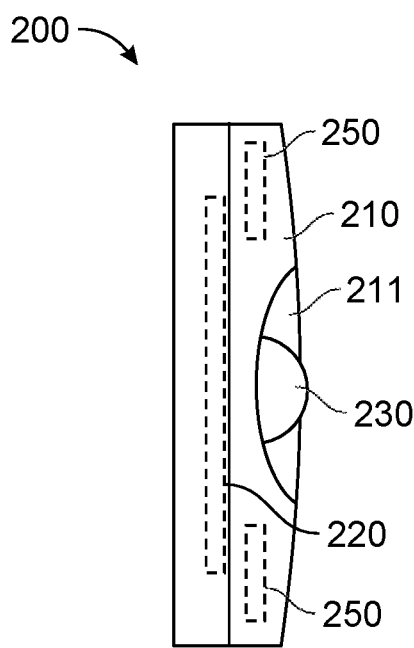
FIG. 2B illustrates an elevational side sectional view of the grinder vibration tool, according to another exemplary embodiment of the present general inventive concept.

FIG. 2B illustrates an elevational side sectional view of the grinder vibration tool 200, according to another exemplary embodiment of the present general inventive concept.

The grinder vibration tool 200 may be constructed from at least one of metal, plastic, wood, glass, and rubber, etc., but is not limited thereto.

The grinder vibration tool 200 may include a main body 210, a vibration motor 220, a button 230, a sensor 240, and a plurality of power sources 250, but is not limited thereto.

Referring to FIGS. 2A and 2B, the main body 210 is illustrated to have a cylindrical shape. However, the main body 210 may be rectangular, circular, conical, triangular, pentagonal, hexagonal, heptagonal, octagonal, or any other shape known to one of ordinary skill in the art, but is not limited thereto.

The main body 210 may be constructed of aluminum and/or silicone. The main body 210 may have a predetermined diameter and a predetermined height. For example, the main body 210 may have a diameter of thirty point sixty-one millimeters (30.61 mm) and a height of four millimeters (4 mm). As such, the main body 210 may be removably disposed within at least a portion of an herbal grinder 10. Specifically, the main body 210 may be removably disposed on at least a portion of a mesh screen of the herbal grinder 10.

The main body 210 may include a recessed surface 211, but is not limited thereto.

The recessed surface 211 may be disposed on at least a portion of a center of the main body 210. Moreover, the recessed surface 211 may be recessed with respect to an outer surface of the main body 210.

Additionally, the main body 210 may be separated into two halves, a first section and a second section. In other words, the first section of the main body 210 may be threadably (i.e., threads) connected to the second section of the main body 210.

The vibration motor 220 may be disposed within at least a portion of the main body 210. The vibration motor 220 may vibrate in response to turning on. As such, the main body 210 may vibrate in response to vibration of the vibration motor 220. It is important to note that the vibration motor 220 is larger than the vibration motor 120. As such, the vibration motor 220 may vibrate a larger surface area of the main body 210 compared to the vibration motor 120. For example, the vibration motor 220 may have a diameter ninety percent of a diameter of the main body 220, whereas the vibration motor 120 may comprise only thirty percent of a diameter of the main body 120. Thus, the vibration motor 220 may vibrate over a larger area, but have an increased use of the plurality of power sources 250 compared to the vibration motor 120.

As a result, the mesh screen of the herbal grinder 10 may vibrate in response to vibration of the main body 210, such that a powder, at least one crystal, and/or at least one trichome disposed on the mesh screen may loosen and/or fall into a collection chamber of the herbal grinder 10.

The button 230 may be disposed on at least a portion of the recessed surface 211 of the main body 210. Referring again to FIG. 2B, the button 230 may be disposed at a lower elevation with respect to the outer surface of the main body 210. The vibration motor 220 may turn on in response to depressing the button 230 a first time. Conversely, the vibration motor 220 may turn off in response to depressing the button 230 a second time different from the first time.

Alternatively, the vibration motor 220 may vibrate at a first predetermined speed level in response to depressing the button 230 for a first predetermined period of time (e.g., five seconds). The vibration motor 220 may vibrate at a second predetermined speed level in response to depressing the button 230 for a second predetermined period of time (e.g., ten seconds), such that the second predetermined speed level is greater than the first predetermined speed level. As such, the vibration motor 220 may loosen the powder, the at least one crystal, and/or the at least one trichome that are more difficult to remove while using the second predetermined speed level that was not successful during the first predetermined speed level.

The sensor 240 may be disposed within at least a portion of the main body 210. The sensor 240 may detect at least one particulate from the powder, the at least one crystal, and/or the at least one trichome in contact with the main body 210. As a result, the sensor 240 may automatically regulate and/or control a speed level of the vibration motor 220 based on the at least one particulate in contact with the main body 210. Furthermore, the sensor 240 may adjust a portion of the main body 210 to vibrate using the vibration motor 220 based on which part of the main body 210 is in contact with the at least one particulate. For example, a first quarter and/or a first half of the main body 210 may have more particulates in contact thereto than a second quarter and/or a second half of the main body 210. As such, the first quarter and/or the first half of the main body 210 may vibrate faster than the second quarter and/or the second half of the main body 210 in response to adjustment of the speed level of the vibration motor 220 by the sensor 240.

Each of the plurality of power sources 250 may include a battery and a solar cell, but is not limited thereto.

The plurality of power sources 250 may be disposed within at least a portion of the main body 210. The plurality of power sources 150 may provide power to the vibration motor 220, the button 230, and/or the sensor 240.

Furthermore, an interior of the main body 210 including the vibration motor 220, the sensor 240, and/or the plurality of power sources 250 may be accessed in response to separating the first section of the main body 210 from the second section of the main body 210.

Therefore, the grinder vibration tool 200 may facilitate extraction of the powder, the at least one crystal, and/or the at least one trichome from the mesh screen of the herbal grinder 10. Also, the grinder vibration tool 200 may reduce time needed to remove the powder, the at least one crystal, and/or the at least one trichome due to automatic shaking thereof instead of by a user.

The present general inventive concept may include a grinder vibration tool 100, including a main body 110 to be disposed on at least a portion of an herbal grinder 10, a vibration motor 120 disposed within at least a portion of the main body 110 to vibrate the main body 110 in response to vibration of the vibration motor 120, and a button 130 disposed on at least a portion of the main body 110 to turn on the vibration motor 120 in response to depressing the button 130 a first time, and turn off the vibration motor 120 in response to depressing the button 130 a second time.

The main body 110 may include a first section, and a second section threadably connected to the first section.

The main body 110 may include a recessed surface 111 to receive the button 130 therein.

The grinder vibration tool 100 may further include a sensor 140 disposed within at least a portion of the main body 110 to detect at least one particulate in contact with the main body 110 and automatically adjust a speed level of the vibration motor 120 based on a location of the at least one particulate in contact with the main body 110.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A grinder vibration tool, comprising:
    a main body to be disposed on at least a portion of an herbal grinder;
    a vibration motor disposed within at least a portion of the main body to vibrate the main body in response to vibration of the vibration motor;
    a button disposed on at least a portion of the main body to turn on the vibration motor in response to depressing the button a first time, and turn off the vibration motor in response to depressing the button a second time; and
    a sensor disposed within at least a portion of the main body to detect at least one particulate in contact with the main body and automatically adjust a speed level of the vibration motor based on a location of the at least one particulate in contact with the main body.

2. The grinder vibration tool of claim 1, wherein the main body comprises:
    a first section; and
    a second section threadably connected to the first section.

3. The grinder vibration tool of claim 1, wherein the main body comprises:
    a recessed surface to receive the button therein.

* * * * *